Patented Dec. 1, 1925.

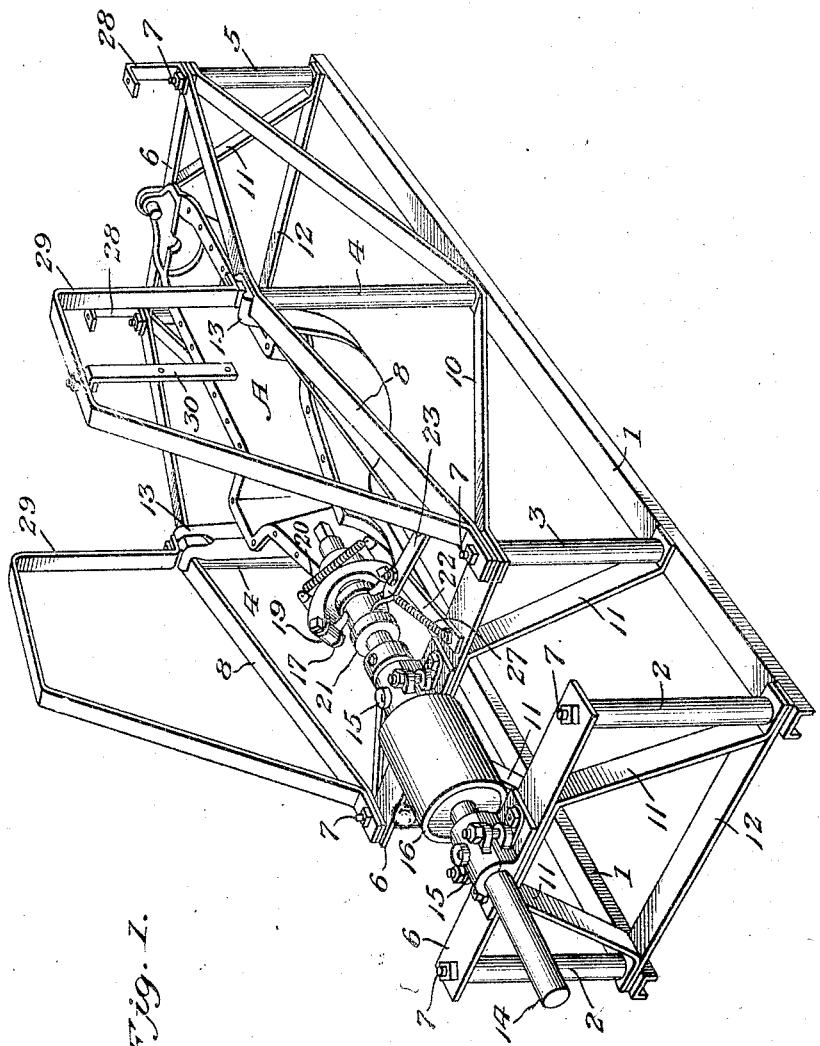

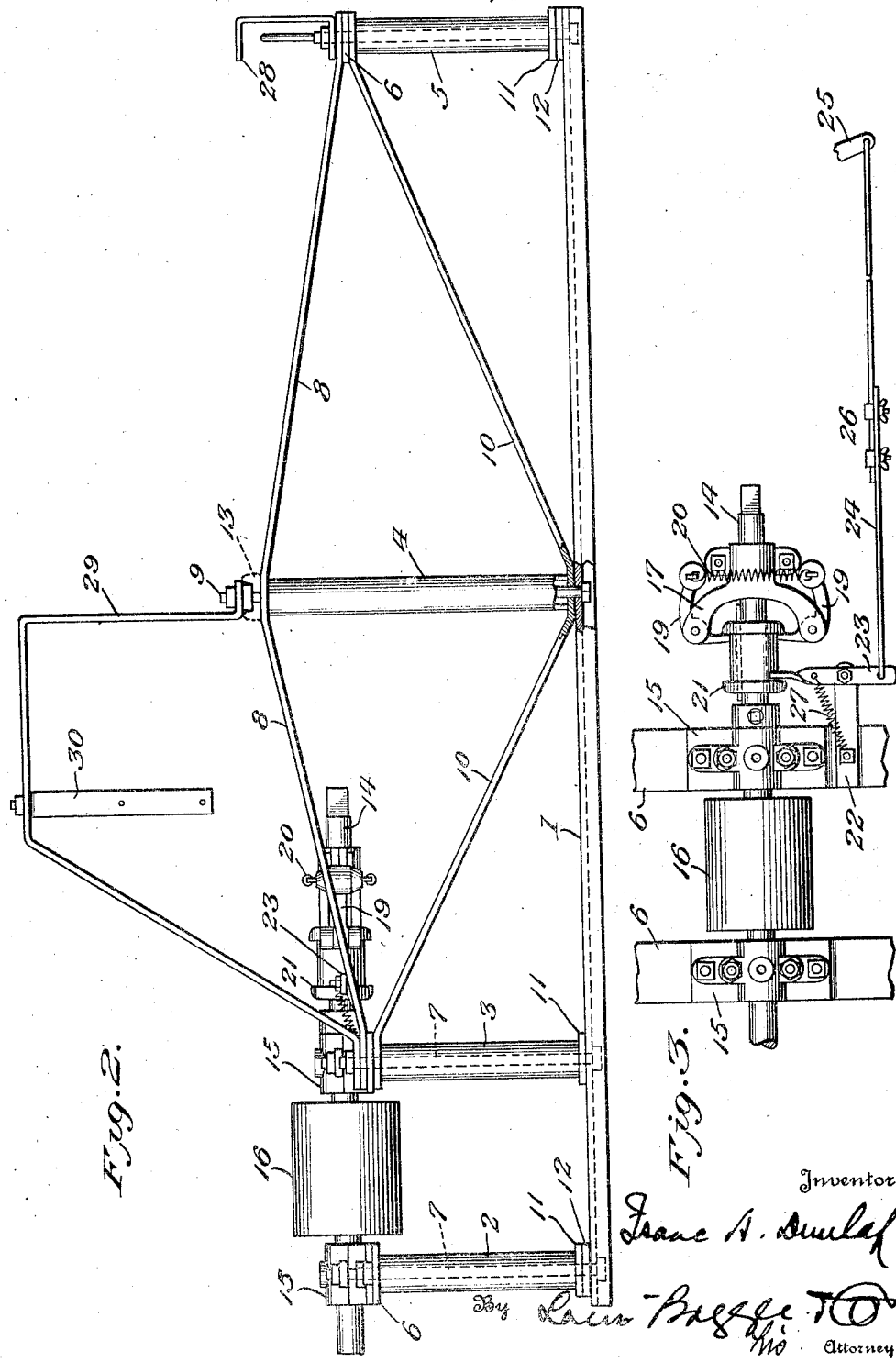

1,564,131

UNITED STATES PATENT OFFICE.

ISAAC A. DUNLAP, OF WICHITA, KANSAS.

PORTABLE FRAME STRUCTURE FOR AUTOMOBILE ENGINES AND POWER-DELIVERING DEVICES.

Application filed February 26, 1924. Serial No. 695,371.

*To all whom it may concern:*

Be it known that I, ISAAC A. DUNLAP, a citizen of the United States, residing at Wichita, in the county of Sedgwick and State of Kansas, have invented certain new and useful Improvements in Portable Frame Structures for Automobile Engines and Power-Delivering Devices, of which the following is a specification.

This invention has reference to a steel frame and governor assembly, including a pulley and suitable bearings in which an automobile engine removed from the automobile may be mounted for transmitting belt power to a lineshaft or any belt driven machinery.

It is an object of this invention to utilize principally used motors of a well-known make of car which is a very commonly used and popular motor, and also other makes of motors to do the ordinary belt power work done by the ordinary stationary gas, gasoline and power engines, ranging from one to twenty H. P.

It is a further object of this invention to provide a substantial steel trussed and braced frame pulley and governor assembly, built along strong, well-braced lines, to sell at a reasonable price in which an automobile engine, either new or used, may be easily mounted by anyone not particularly experienced in this line of work, so it may be used for the ordinary work around the farm, shop or small factory.

Provision is made for supporting the motor in this invention in such manner that it cannot work loose in ordinary work, thus allowing the motor to get out of line with the shaft and bearings. Provisions are also made to keep the frame in a square and upright position during the heavy strain of the belt pull during the kind of work for which this invention is intended.

These, and other objects and advantages of this invention, will be shown in the accompanying drawings, but may be changed and modified so long as such changes and modifications make no material departure from the outstanding features of the invention, as expressed in the appended claims.

In the drawings:

Figure 1 is a perspective view of the device;

Figure 2 is a side elevation;

Figure 3 is a detailed plan view of the governor and drive pulley arrangement.

The numeral 1 indicates the longitudinal base members consisting of U-shaped channel irons. Extending vertically from the base are the tubular supports 2, 3, 4 and 5. The members 2, 3 and 5 support transverse supporting bars 6—6 which are secured to the supporting members 2 and 3 by suitable bolts 7 which extend upwardly through the tubular members 2 and 3. The vertical supports 4 arranged intermediate of the vertical supports 3 and 5 are somewhat longer, the upper ends of said supports being braced by suitable truss members 8 secured to the supports 4 by bolts 9 extending upwardly through the supports 4, a companion longitudinal truss 10 extending from the bottom of each of the supports 4 to the upper ends of the vertical supports 3 and 5, the ends of said longitudinal supports being received upon the bolts 7—7 all of which are held in place by suitable nuts. The horizontal transverse supports 6—6 are additionally braced by suitable braces 11 which extend from the base members 1 to approximately the center of the transverse members 6—6 being suitably secured thereto. Each end of the base consisting of the channel bars 1—1 is spaced apart by suitable transverse space bars 12—12. As illustrated in Figure 1, the crank case of the engine A is suspended between the forward end of the frame, the crank case being supported at one end by suitable lugs 13—13 integral with the crank case, the outer ends being received directly above the vertical supports 4—4 and approximately intermediate of the truss rod 8. The extreme forward end of the crank case rests upon the transverse member 6 at one end of the frame.

Mounted upon the rear end of the frame and upon the transverse members 6—6 is the power-delivering shaft 14 which is a necessary part of the machine rotatively journaled in suitable bearings 15—15 secured to the transverse members 6—6. A pulley 16 is keyed to the shaft intermediate of the bearings 15—15. The inner end of the shaft 14 is machined to fit and be turned by a motor. Adjacent the end of the shaft is a centrifugal governor 17 which is keyed or clamped to the drive shaft 14. This governor consists of the radially swinging bell cranks 19—19, the outer ends of which are initially contracted by a spring 20, the inner ends adapted to engage a longitudinally movable collar 21 slidably keyed to the shaft 15.

Pivotally mounted to the bracket 22 is a lever 23, one end of which is adapted to engage the collar 21, the outer end thereof being connected by a suitable rod 24 to the air inlet of the carbureter by means of a suitable arm 25. Intermediate the arm 25 and the lever 23 is an adjustable turn buckle 26 for the proper adjustment of the carbureter. A spring 27 connected to the lever 23 acts to move the lever 23 in one direction while the collar 21 as it moves longitudinally of the shaft 14 affects the movement of the lever 23 in opposite directions.

Brackets 28—28 extending upwardly from the forward end of the frame provide a means for supporting the usual radiator of the engine. Vertical supports 29—29 extend upwardly from the central portion of the truss frame and extending horizontally having their outer free ends bent downwardly and received on the top of the vertical supports 3—3, for acting as a support for the gasoline tank. Depending from one of these frames is an arm 30 which is to support the coil box.

It will thus be seen that I have devised a frame for supporting a gasoline automobile motor and its cooperating parts in such a manner as to utilize the same as a stationary power plant including therewith suitable governor mechanism for controlling the speed of the engine.

It is obvious that more or less slight changes may be made in the general structure without departing from the general scope of the invention. I therefore do not wish to be limited to the exact structure shown.

I claim:

1. A portable frame structure including longitudinal base members spaced apart, vertical supports mounted on each of the base members, intermediate supports mounted on the base members between the vertical supports, and longitudinal truss rods secured to the upper ends of the vertical supports and to the upper and lower ends of the intermediate supports for bracing said supports.

2. A portable frame structure including longitudinal base members spaced apart, vertical supports mounted on each of the base members adjacent the front and rear ends thereof, intermediate supports mounted on the base members between the vertical supports, longitudinal truss rods connected with the upper ends of the vertical supports and with the upper and lower ends of the intermediate supports for bracing the supports, transverse supporting bars connected with the upper ends of the vertical supports, and supporting rods extending upwardly from the intermediate supports and having the ends thereof bent rearwardly and connected with the rear vertical supports.

3. A portable frame structure including longitudinal base members spaced apart, vertical supports mounted on each of the base members adjacent the front and rear ends thereof, intermediate supports mounted on the base members between the vertical supports, transverse supporting bars connected with the upper ends of the vertical supports, and supporting rods extending upwardly from the intermediate supports and having the ends thereof bent rearwardly and connected with the rear vertical supports.

4. A portable frame structure including longitudinal base members spaced apart, vertical supports mounted on each of the base members adjacent the front and rear ends thereof, intermediate supports mounted on the base members between the vertical supports, and supporting bars extending upwardly from the intermediate supports and having substantially the intermediate portion thereof bent rearwardly and downwardly and connected with the rear vertical supports forming a superstructure supporting frame.

5. A portable frame structure including longitudinal base members spaced apart, space plates connected with the ends of the base members for holding said members in spaced relation, pairs of vertical supports mounted on the base members adjacent the front and rear ends thereof, spacer plates secured to the upper ends of each pair of vertical supports, intermediate supports mounted on the base members between the vertical supports, longitudinal truss rods connected with the upper ends of the vertical supports and with the upper and lower ends of the intermediate supports, and supporting bars extending upwardly from the intermediate supports and having substantially the intermediate portion thereof bent rearwardly and downwardly and connected with the rear vertical supports forming a superstructure supporting frame bridging each of the respective intermediate and rear vertical supports.

In testimony whereof I affix my signature.

ISAAC A. DUNLAP.